United States Patent Office

3,453,230
Patented July 1, 1969

3,453,230
ROOM TEMPERATURE CURABLE ACRYLATE RUBBERS
Edwin P. Plueddemann, Midland, Mich., assignor to Dow Corning Corporation, Midland, Mich., a corporation of Michigan
No Drawing. Continuation of application Ser. No. 419,206, Dec. 17, 1964. This application Nov. 23, 1966, Ser. No. 596,420
Int. Cl. C08d 9/00
U.S. Cl. 260—41           13 Claims

ABSTRACT OF THE DISCLOSURE

A curable acrylate-organosilicon composition, said composition exhibiting superior weatherability, heat stability and adhesion to substrates. An example of said composition is one prepared from the copolymerization of ethyl acrylate, vinyltriethoxysilane and mercaptopropyltrimethoxysilane.

---

This application is a continuation of application Ser. 419,206 filed Dec. 17, 1964 now abandoned.

This application relates to modified acrylic compositions which are moldable before cure, are curable at room temperature, and which cure to elastomers. The cured compositions of this invention exhibit superior weatherability, heat stability, and adhesion to substrates when compared with their corresponding acrylic resins.

The materials of this invention are made by the process of reacting in the absence of water a mixture consisting essentially of (a) 100 molar parts of

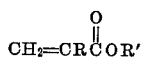

(b) from 1.0 to 8 molar parts of

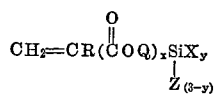

(c) from 0 to 50 molar parts of $CH_2=CA_2$ (d) from 0.5 to 4 molar parts of

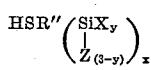

and (e) from 0.02 to 1 molar part of a free radical forming polymerization catalyst, the molar quantity of (b) present being from 0.7 to 4 times the molar quantity of (d) present, where R is selected from the group consisting of hydrogen and methyl, the majority of the R groups in (a) being hydrogen, R' is an alkyl radical of no more than 12 carbon atoms, Q is an alkylene radical, R" is selected from the group consisting of monovalent and divalent hydrocarbon radicals, free of aliphatic unsaturation, the adjacent sulfur atom being bonded to an aliphatic carbon atom, X is a hydrolyzable group, Z is a monovalent hydrocarbon radical free of aliphatic unsaturation, with no more than 7 carbon atoms, A is selected from the group consisting of hydrogen, chlorine, and the acetate, phenyl, nitrile, and vinyl groups, at least one A group being selected from the group consisting of hydrogen and chlorine, $x$ has an average value of 0 to 1, and $y$ has an average value of 1 to 3, whereby a plastic, vinylic polymer containing an average of 25 to 200 (a) units per molecule is formed that cures on exposure to moisture to an elastomer.

R' can be any monovalent alkyl radical of no more than 12 carbon atoms, such as methyl, ethyl, propyl, isohexyl, octyl or dodecyl.

Q can be any alkylene radical such as methylene, trimethylene,

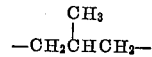

hexamethylene, or octamethylene.

R" can be any divalent hydrocarbon radical, free of aliphatic unsaturation, where the adjacent sulfur atom is bonded to an aliphatic carbon atom. Examples of R", shown with their adjacent sulfur atoms, are:

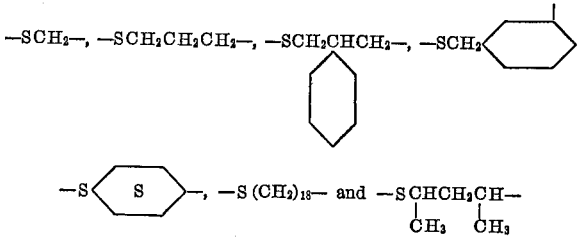

R" can also be any monovalent hydrocarbon radical such as the radicals shown above as examples of R', and for further examples, benzyl, octadecyl and 2-phenylpropyl.

X is any hydrolyzable group known to the art: e.g. halogen atoms such as chlorine or bromine; alkoxy groups such as methoxy or ethoxy; acyloxy groups such as acetoxy or propionoxy, ketoxime groups such as $(CH_3)_2CNO-$ or

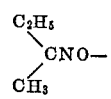

alkoxyalkoxy groups such as $CH_3OC_2H_5-$ or $C_2H_5OC_2H_5O-$; or the isocyanate group. It is preferred for X to be methoxy, ethoxy, acetoxy, or

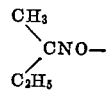

Z can be any monovalent hydrocarbon radical, free of aliphatic unsaturation, which has no more than seven carbon atoms, e.g. methyl, ethyl, isopropyl, sechexyl, phenyl, or tolyl.

Examples of ingredient (a) are ethyl acrylate; methyl acrylate; a mixture of 40 mol percent ethyl acrylate, 15 mol percent decyl acrylate, and 45 mol percent methyl methacrylate; a mixture of 80 mol percent ethyl acrylate and 20 mol percent butyl acrylate; a mixture of 80 mol percent ethyl acrylate and 20 mol percent butyl methacrylate; and a mixture of 50 mol percent ethyl acrylate and 50 mol percent methyl acrylate.

Examples of ingredient (b) are

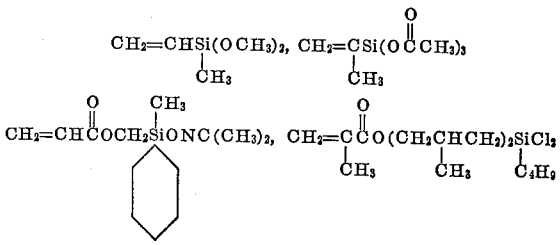

and

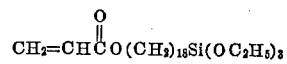

Examples of ingredient (c) are

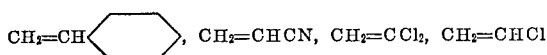

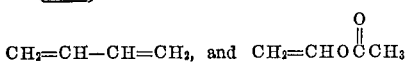

Examples of ingredient (d) are

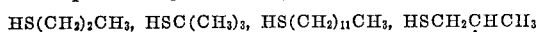

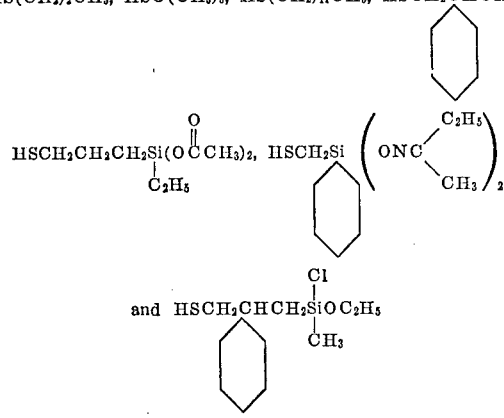

The compositions of this invention are formed from the above-mentioned ingredients by vinylic polymerization, which is initiated by ingredient (e).

When the compositions of this invention are exposed to moisture, for example, the moisture of the atmosphere, the X groups which are bonded to the silicon atoms are hydrolyzed, being replaced by silicon-bonded hydroxyl groups. The hydroxyl groups in turn react with each other, or other X groups, to form siloxane (SiOSi) linkages. By this process the polymer molecules of the composition of this invention are bonded together to form an infusible elastomer.

However, as long as the compositions of this invention are sealed in a vessel away from the atmosphere and other forms of moisture, they remain relatively stable. The compositions of this invention therefore have potential commercial utility as sealants, coatings, and molding compounds, since they can remain moldable and spreadable for a long time while sealed in a package, but they can spontaneously cure to form infusible elastomers on exposure to the atmosphere.

It is often desirable to add a curing catalyst for the condensation of silanol groups to the compositions of this invention in order to accelerate the cure of the compositions upon exposure to moisture. Any silanol condensation catalyst is suitable; particularly those which do not cause siloxane bonds to rearrange; e.g. alkali phenoxides and derivatives such as sodium phenoxide, potassium phenoxide, tetramethylammonium phenoxide, tetraethylphosphonium phenoxide, and

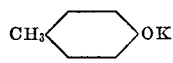

Other desirable catalysts are primary, secondary and tertiary amines, preferably having a dissociation constant of at least $10^{-10}$, such as sec-butylamine, hydrazine, t-octylamine, dimethylaminomethylphenol, ethylenediamine, quinine, arginine, o-methyoxybenzylamine, triethylamine, aniline, and pyridine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, alpha,beta-dimethylacrolein and amylamine, butyraldehyde and butylamine, acrolein and allylamine, and formaldehyde and heptylamine.

Another class of catalysts for the reaction is the carboxylic acid salts of metals higher than hydrogen in the electromotive force series of metals. Specific examples of the metals that can be used are lead, tin, nickel, cobalt, iron, cadmium, chromium, zinc, manganese, aluminum, magnesium, barium, strontium, calcium, cesium, rubidium, potassium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate, potassium acetate, chromium octoate; salts of polycarboxylic acids such as dibutyl tin adipate and lead sebacate; and salts of hydroxy carboxylic acids such as dibutyl tin dilactate.

Another class of catalysts is the organic titanium compounds. These are titanium esters in which there are TiOC linkages, being derived either from an alcohol or a carboxylic acid. If derived solely from a carboxylic acid, the titanate falls into the class of catalysts described above. If derived in part of entirely from an alcohol or alcohols, the titanate is of the formula $Ti(OY)_4$, wherein Y is the residue of an alcohol molecule. The derived titanate can be from a combination of a carboxylic acid and alcohol.

Specific examples of organotitanium compounds which are operative herein include tetraethyl titanate,
tetraisopropyl titanate,
tetra-n-butyl titanate,
tetra-2-ethylhexyl titanate,
tetraphenyl titanate,
tetraoctadecyl titanate,
tetra-12-octadecenyl titanate,
triethanolamine titanate,
$[(HOC_3H_6)_2N(CH_2)_3O]_2Ti[OCH(CH_3)_2]_2$,
$[(CH_3CH_2)_2N(CH_2)_2O]_4Ti$,
$[(C_6H_{13})_2N(CH_2)_6O]_2Ti[OCH_2CH(CH_3)_2]_2$,
$[C_4H_9NH(CH_2)_4O]_4Ti$,
$(HOCH_2CH_2NHCH_2O)_4Ti$,
tetrakistriethanolamine titanate-N-stearate,
ethylene glycol titanate,
$Ti[OCH_2CH(CH_2CH_3)CH(OH)CH_2CH_2CH_3]_4$,
tetra(methylcellosolve)titanate,
bis(acetylacetonyl)diisopropyl titanate,

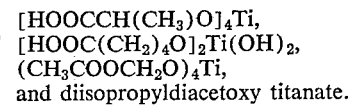

$[HOOCCH(CH_3)O]_4Ti$,
$[HOOC(CH_2)_4O]_2Ti(OH)_2$,
$(CH_3COOCH_2O)_4Ti$,
and diisopropyldiacetoxy titanate.

In addition, solvent-soluble partial hydrolyzates of any of the above titanates can be employed and, in addition, part or all of the organoxy radicals can be replaced by $M_3SiO-$ radicals wherein M is a monovalent organic radical.

The above list of catalysts is only a partial list of some of the more desirable classes of catalysts, and is not meant to exclude other operative catalysts.

When a curing catalyst is used in the compositions of this invention, it is preferred to use from 0.02 to 2 parts by weight of catalyst per 100 parts by weight of the above-described polymer.

The curing of the compositions of this invention can be accelerated by the use of any suitable catalyst or by heating the composition. However, by proper choice of X groups or of catalyst, the compositions of this invention can be made room temperature vulcanizable. When X is acetoxy,

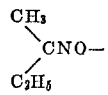

or (CH₃)₂CNO—, hydrolysis and condensation at room temperature without a catalyst is practical, though a catalyst may be desirable.

The temperature of the reaction for preparing the compositions of this invention is not critical as long as it is above the dissociation temperature of the free radical forming catalyst (ingredient (e)) used, and below the decomposition temperature of the polymer formed. It is usually desirable to run the polymerization reaction at a temperature of 40° to 120° C. It is believed that the reaction proceeds by a free radical mechanism. The reaction time is a matter of minutes or hours.

Examples of suitable free radical forming catalysts include tertiarybutylperbenzoate, dibenzoylperoxide, N,N'-azo bis(isobutyronitrile), dicumyl peroxide, tertiary-butyl peracetate, ammonium persulfate, 2,5-dimethyl-2,5-dihydroperoxyhexane, and bis(2,4-dichlorobenzoyl)peroxide.

The compositions of this invention cure at any temperature, though higher temperatures accelerate the reaction. It is preferred to cure the compositions at temperatures over 5° C. in order that the curing reaction is not inconveniently slow.

If ingredient (d), the mercaptan or mercaptosilane, were not included in the compositions of this invention, materials similar to those disclosed in U.S. Patent 2,922,806, would result, which materials are high polymers.

The function of ingredient (d) is twofold: (1) it serves as a chain transfer agent, halting the growth of polymer molecules while concurrently starting the growth of new polymer molecules; and (2), if (d) has a silyl group, it places that functional silyl group on one end of the polymer molecule, which is a desirable place for the functional silyl group to be in order to produce a strong product after cure. It is therefore desirable for $x$ of ingredient (d) to be 1.

When $x$ is 0, it is especially desirable for there to be at least twice as many molar parts of (b) present, compared with the molar parts of (d), to afford an adequate number of crosslinking sites in the composition.

The size of the polymer molecule can be best controlled through the amount of ingredient (d) added; the polymer size decreases as the amount of ingredient (d) present increases. In the process of this invention, the permissible range of ingredient (d) present causes polymers with about 25 to 200 units of (a) per molecule to form.

The molecular weight of the polymer may also be influenced to a minor extent by the choice of solvent, and by the monomer-solvent ratio. It is preferred, however, to minimize the chain-transfer activity of the solvent and depend on (d) for control of molecular weight. For this reason, fairly high concentrations of monomers, e.g. 50%, are generally used with solvents which are less active as chain-transfer agents such as benzene, ethylacetate, ethylene dichloride, acetone, dioxane, or tertiary butyl alcohol.

The polymerization rate, yield, and molecular weight of the polymer are all influenced by the concentration of the free radical initiator used (ingredient (e)). Thus, a low initiator concentration (e.g. 0.02%) gives a high molecular weight polymer at a low polymerization rate, and with reduced yield. A higher initiator concentration, such as 0.1 to 1.0 molar part per 100 molar parts of the monomers, results in more rapid polymerization and more complete reaction, but with reduced molecular weight. Higher initiator concentrations (e.g. 0.1 to 0.5 molar part) are preferred for the economic production of polymer.

The viscosities of the uncured compositions of this invention are controlled by controlling the size of the polymer present. Whereas, the polymers of U.S. Patent 2,922,-806 have unlimited size, and are therefore difficult to mold, spread, or shape, the polymers of this invention can be easily worked, since they are of controlled and limited molecular weight. Nevertheless, when the compositions of this invention are cured, compositions which are generally infusible elastomers result.

By "plastic, vinylic polymer" is meant a polymer formed through the polymerization of vinyl groups, which are possessed by ingredients (a), (b), and (c), and which is of a sufficiently low degree of polymerization that it is deformable by mild pressure so as to be moldable and spreadable.

The composition of copolymers containing (a), (b) and (c) units will be determined by the respective monomer concentrations, and by the reactivity ratios of the monomers. Monomers having similar reactivity ratios, e.g. acrylates, methacrylates, styrene, acrylonitrile, and vinylidine chloride, give copolymers having ingredient units in approximately the same ratio as the monomer feed; but less reactive monomers like vinyl chloride or vinyl acetate will enter the polymer less readily. It is therefore often beneficial to use an excess of the less reactive monomers in the initial feed to increase the polymerization rate of the unreactive monomers, and it is also desirable to add part of the more reactive monomers gradually as the polymerization progresses in order to obtain a polymer with as nearly a constant composition as possible.

When $x$ of ingredient (b) is 0, ingredient (b) should be considered to be a less reactive monomer. When $x$ of ingredient (b) is 1, the ingredient (b) has the typical reactivity of other acrylic esters. For this reason it is preferred that $x$ of ingredient (b) be 1.

The polymers claimed by this application are only those which cure to elastomeric polymers, i.e., those cured polymers that are deformable, and which tend to snap back toward their original shape when released.

Whether or not a given polymer cures to an elastomer is predictable to those skilled in the art, and primarily depends on the nature of the (a) group or groups present, the nature and amount of (c) groups present, and the number of silicon-bonded X groups per molecule which act as cross-linking sites.

Generally, the more of ingredient (a) that is alkylacrylate and the less that is lower alkyl methacrylate, the softer and more flexible the cured elastomer is. Ingredient (c) generally acts to stiffen the cured elastomer; therefore, the softest and most flexible elastomers contain no ingredient (c). It is preferred for the uncured polymer to have an average of 2 to 3 silyl groups (ingredients (b) and (d)), and 2.2 to 6 X groups per molecule. Increasing the number of silicon atoms or X groups will cause a stiffer elastomer to form.

Further information on the polymerization and properties of acrylic polymers can be found in Riddle, Monomeric Acrylic Esters, Reinhold, New York (1954).

More than one species of the various ingredients (a) through (e) can be used, e.g. ingredient (c) can be a mixture of styrene and vinylidene chloride.

The preferred ingredient (a) contains over 50 mol per cent of ethyl acrylate.

A preferred R" group is trimethylene.

Inorganic fillers can be added to the compositions of this invention to reduce the "slump" of the uncured polymer, and to improve the physical characteristics of the cured composition. Examples of such fillers are silica, alumina, titania, glass fibers, glass powder, Fe₂O₃, carbon black, asbestos, and powdered metals such as copper, iron, or aluminum. While other proportions can be operative 10 to 100 parts by weight of fillers are usually added to each 100 parts of the polymer of this invention.

Crosslinking agents such as ethylpolysilicate or methyltriethoxysilane can be added to the compositions to improve their properties. Also the other known curing techniques used with silicone room temperature vulcanizing elastomers are generally operative in the compositions of this invention.

Other additives can also be included in the compositions of this invention such as plasticizers, coloring agents, and extending fillers.

7

The following examples are illustrative only and should not be construed as limiting the invention, which is properly delineated in the appended claims.

EXAMPLE 1

The following mixture was refluxed for 6 hours; 50 g. (0.5 mole) of ethyl acrylate, 3 g. (0.020 mole) of vinyltrimethoxysilane, 1 g. (0.005 mole) of

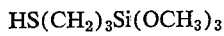
$HS(CH_2)_3Si(OCH_3)_3$ 50 g. of benzene, and 0.1 g. (0.0004 mole) of benzoyl peroxide.

After the reflux, the composition was stripped to 100° C. The residue was a clear, viscous fluid copolymer of ethyl acrylate and vinyltrimethoxysilane.

To three samples of this copolymer there was added 0.5 weight percent, based on the weight of the copolymer, of one of each of the catalysts shown below.

The polymers were spread into gummy films about 10 mils thick and allowed to stand for one week.

The condition of the films at that time, compared with each catalyst used, is as follows.

| Catalyst: | Film |
|---|---|
| Dibutyltindilaurate | Very soft rubber. |
| Tetraisopropyl titanate | Moderately soft rubber. |
| SnCl₄ | Moderately stiff rubber. |

EXAMPLE 2

The following mixture was refluxed for 6 hours; 50 g. (0.5 mole) of ethyl acrylate, 2.5 g. (0.0121 mole) of

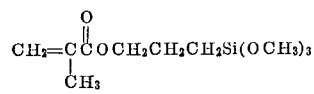

1 g. (0.0051 mole) of $HS(CH_2)_3Si(OCH_3)_3$, 0.1 g. (0.0004 mole) of benzoyl peroxide, and 50 g. of benzene.

After the reflux, samples of the composition were mixed with 0.5 weight percent of the curing catalysts shown below and placed on metal panels to form films. The benzene was allowed to evaporate, leaving a gummy film.

After two days of standing in the air, the condition of the films was as follows.

| Catalyst: | Film |
|---|---|
| Tetraisopropyl titanate | Clear, flexible rubber (slightly yellow). |
| SnCl₄ | Clear, flexible rubber. |

The curing times of these films were shorter, and the rubbers stronger, than the cured films of Example 1.

EXAMPLE 3

The following mixture was refluxed with a drying tube on the condenser for 8 hours; 50 g. (0.5 mol) of ethyl acrylate, 1.5 g. (0.0072 mole) of $HS(CH_2)_3Si(OCH_3)_3$, 1.3 g. 0.0057 mole of

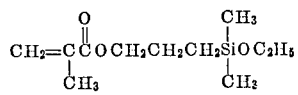

0.1 g. 0.004 mole of benzoyl peroxide, and 50 g. of benzene.

The composition was stripped to 120° C. to recover a clear, viscous liquid.

To a 7 g. portion of this liquid there was added 2 drops of tetraisopropyl titanate solution. The composition was then allowed to stand in an open aluminum dish in the air. Within 24 hours the composition cured to a clear rubbery solid.

Other portions of the stripped composition were exposed to the air without catalyst. One sample which had been exposed at room temperature became quite tacky after two days. Another sample which was heated in the air to 100° C. cured to a clear, rubbery solid in two hours.

EXAMPLE 4

A mixture of 40 g. (0.4 mole) of ethyl acrylate, 10 g. (0.18 mole) of acrylonitrile, 1 g. (0.005 mole) of $HS(CH_2)_3Si(OCH_3)_3$, 2.5 g. (0.01 mole) of

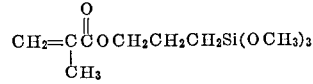

0.1 g. of N,N'-azo bis(isobutyronitrile), and 55 g. of benzene was refluxed for 4 hours. An additional 0.1 g. of N,N'-azo bis(isobutyronitrile) was then added, and the mixture was refluxed for 6 more hours.

The mixture was then stripped to 150° C. to isolate 53 g. of a polymer that was a viscous gum at room temperature.

The gum was mixed with 0.1 g. of tetraisopropyltitanate and exposed to air at room temperature.

Within two days the gum cured to a tough, flexible, rubbery solid with an elongation of 200%.

EXAMPLE 5

When a mixture of 0.2 mole of butyl acrylate, 0.1 mole of methyl methacrylate, 0.003 mole of 2-ethylhexyl mercaptan, 0.007 mole of

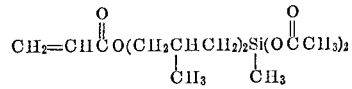

and 0.001 mole of t-butylperbenzoate, is refluxed in toluene for 5 hours and stripped to 100° C., a viscous, polymeric fluid is formed which cures to an elastomer on exposure to the atmosphere.

EXAMPLE 6

Equivalent results are obtained when 0.4 mole of methyl acrylate, 0.3 mole of propyl methacrylate, 0.1 mole of vinyl chloride, 0.021 mole of 2-phenylpropylmercaptan, 0.045 mole of

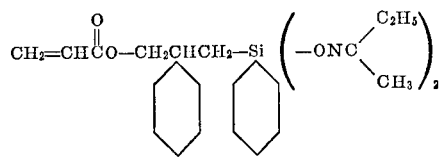

and 0.001 mole of t-butyl peracetate is refluxed in cyclohexane for 7 hours and stripped to 100° C.

That which is claimed is:

1. The process of reacting, in the absence of water and at a free radical forming temperature, a composition consisting essentially of (a) 100 molar parts of

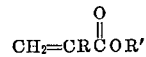

(b) from 1.0 to 8 molar parts of

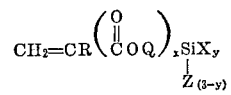

(c) from 0 to 50 molar parts of $CH_2=CA_2$, (d) from 0.5 to 4 molar parts of

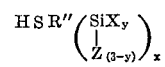

and (e) from 0.02 to 1 molar part of a free radical forming polymerization catalyst, the molar quantity of (b) present being from 0.7 to 4 times the molar quantity of (d) present, where R is selected from the group consisting of hydrogen and methyl, the majority of the R groups in (a) being hydrogen, R' is a monovalent alkyl radical of no more than 12 carbon atoms, Q is an alkylene radical, R" is selected from the group consisting of monovalent and divalent hydrocarbon radicals free of aliphatic unsaturation, R" being monovalent when $x$ is 0 and divalent when $x$ is 1, the adjacent sulfur atom being bonded to an aliphatic carbon atom, X is a hydrolyzable group, Z is a monovalent hydrocarbon radical, free of aliphatic unsaturation, with no more than 7 carbon atoms, A is selected from the group consisting of hydrogen, chlorine, and the acetate, phenyl, nitrile, and vinyl groups, at least 1 A group being selected from the group consisting of hydrogen and chlorine, $x$ has an average value of 0 to 1, and $y$ has an average value of 1 to 3, whereby a plastic, vinylic polymer containing an average of 25 to 200 (a) units per molecule is formed that cures on exposure to moisture to an elastomer.

2. A copolymer consisting essentially of
(a) 100 molar parts of

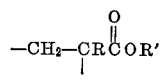

units, (b) from 1.0 to 8 molar parts of

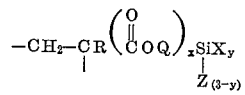

units, (c) from 0 to 50 molar parts of —CH$_2$—CA$_2$ units, and (d) from 0.5 to 4 molar parts of

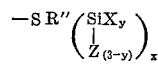

units, the molar quantity of (b) present being from 0.7 to 4 times the molar quantity of (d) present, where R is selected from the group consisting of hydrogen and methyl, the majority of the R groups in (a) being hydrogen, R' is a monovalent alkyl radical of no more than 12 carbon atoms, Q is an alkylene radical, R" is selected from the group consisting of monovalent and divalent hydrocarbon radicals free of aliphatic unsaturation, R" being monovalent when $x$ is 0 and divalent when $x$ is 1, the adjacent sulfur atom being bonded to an aliphatic carbon atom, X is a hydrolyzable group, Z is a monovalent hydrocarbon radical, free of aliphatic unsaturation, with no more than 7 carbon atoms, A is selected from the group consisting of hydrogen, chlorine, and the acetate, phenyl, nitrile, and vinyl groups, at least one A group being selected from the group consisting of hydrogen and chlorine, $x$ has an average value of 0 to 1, and $y$ has an average value of 1 to 3, the copolymer being a plastic, vinylic polymer containing an average of 25 to 200 (a) units per molecule, which cures on exposure to moisture to an elastomer.

3. The cured composition made by exposing the polymer of claim 2 to the atmosphere.

4. The infusible elastomer made by exposing the polymer of claim 2 to the atmosphere while the material is in contact with a silanol condensation catalyst.

5. A composition consisting essentially of 100 parts by weight of the polymer of claim 2, from 10 to 100 parts by weight of an inorganic filler, and from 0.02 to 2 parts by weight of a condensation catalyst.

6. The composition of claim 2 where R" is trimethylene.

7. The composition of claim 2, where $x$ is 1.

8. The composition of claim 2 where $x$ is 1, and Q is trimethylene.

9. The composition of claim 2 where $y$ is 2.

10. The composition of claim 2 where X is selected from the group consisting of methoxy and ethoxy.

11. The composition of claim 2 where reactant ingredient (a) contains over 50 mol percent ethyl acrylate.

12. The composition of claim 2 where reactant ingredient (a) contains ethyl acrylate, (b) is

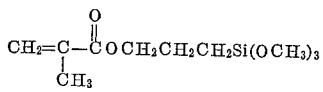

and (d) is HSCH$_2$CH$_2$CH$_2$Si(OCH$_3$)$_3$.

13. The copolymer of claim 2 where the ingredients and proportions are so selected as to yield an average of 2 to 3 silicon atoms and 2.2 to 6 X groups per molecule.

References Cited

UNITED STATES PATENTS

| | | | |
|---|---|---|---|
| 2,922,806 | 1/1960 | Merker | 260—448.2 |
| 2,956,044 | 10/1960 | Merker | 260—46.5 |
| 3,203,919 | 8/1965 | Brachman | 260—29.6 |

DONALD E. CZAJA, *Primary Examiner.*

M. I. MARQUIS, *Assistant Examiner.*

U.S. Cl. X.R.

117—13.51, 161; 260—18, 37, 46.5, 80, 86.1, 89.5, 448.2, 827